Dec. 26, 1950  R. J. ANDERSON  2,535,715
DUMPING MECHANISM FOR MOLD CONVEYERS
Filed March 6, 1948  4 Sheets-Sheet 1
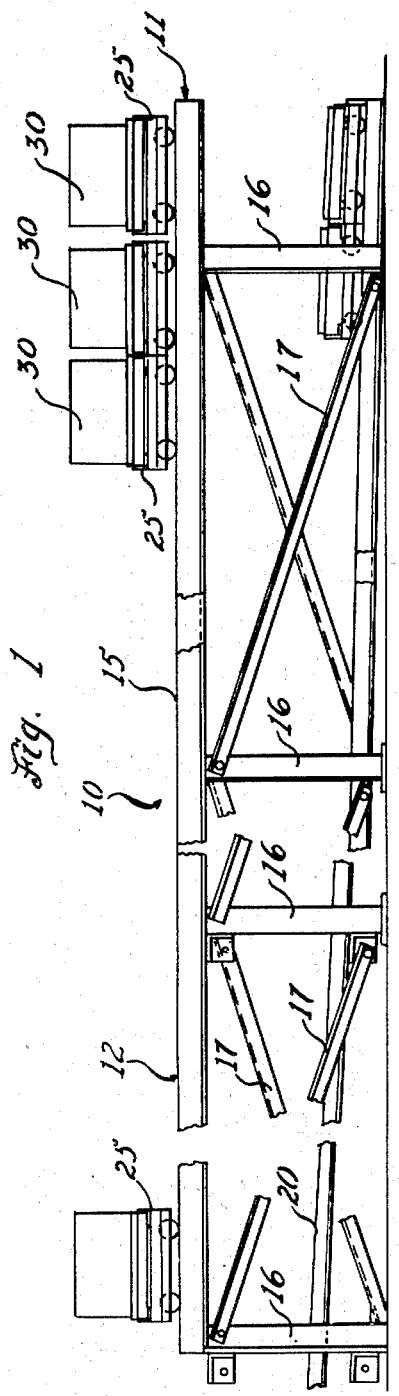
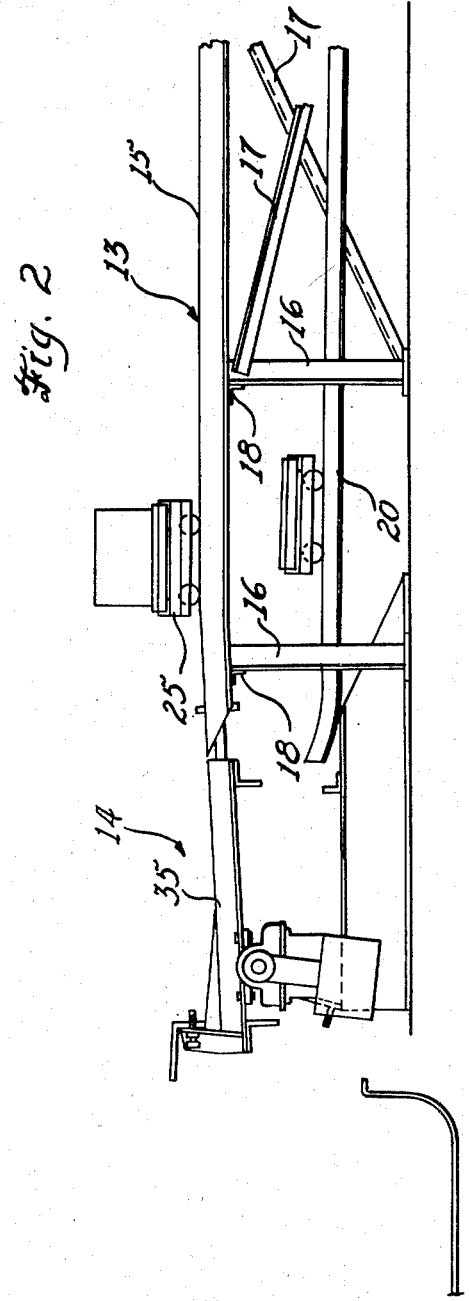
Inventor
Russell J. Anderson
By Hilmond O. Vogel
Attorney Dec. 26, 1950   R. J. ANDERSON   2,535,715
DUMPING MECHANISM FOR MOLD CONVEYERS
Filed March 6, 1948   4 Sheets-Sheet 2

Inventor
Russell J. Anderson
By Hilmond O. Vogel
Attorney

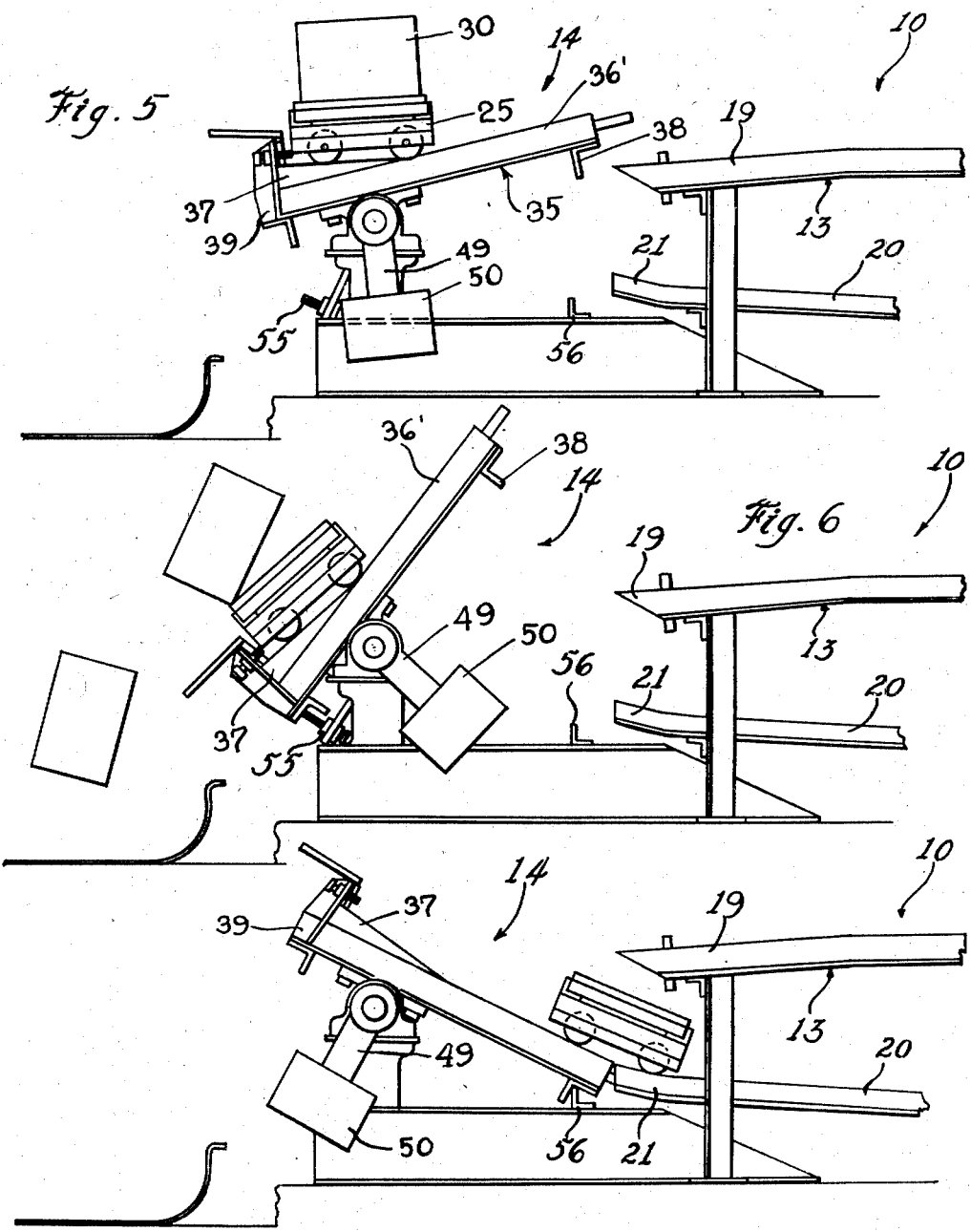

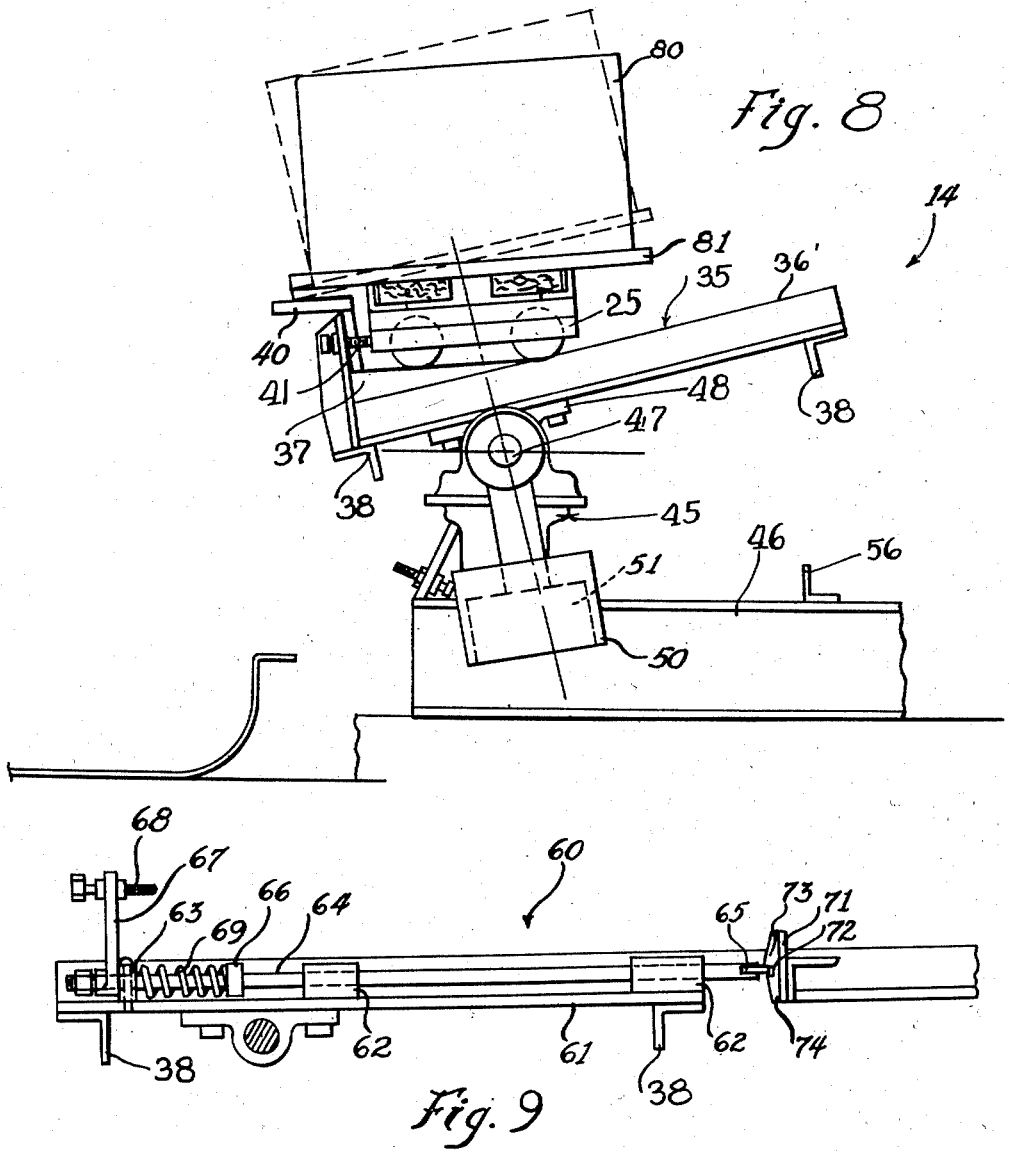

Patented Dec. 26, 1950

2,535,715

UNITED STATES PATENT OFFICE 2,535,715

DUMPING MECHANISM FOR MOLD CONVEYERS

Russell J. Anderson, Racine, Wis., assignor to Belle City Malleable Iron Company, a corporation of Wisconsin Application March 6, 1948, Serial No. 13,426

8 Claims. (Cl. 214—50)

This invention relates to a conveyer for conveying molds, and more particularly to a dumping mechanism therefor. More specifically this invention relates to an automatically operable dumping cradle for discharging molds from a mold conveyer.

In many foundries it is the general practice to handle molds individually in their advance through the founding processes. The molds may be manually transported from the molding machines to the pouring station, or they may be moved with the use of power, such use generally being in the form of a crane, truck, etc. By the use of these methods, increased production schedules have been seriously curtailed. The output per man was greatly dependent on the individual's ability in moving and transporting the molds to their different stations. Applicant perceived the need for a more efficient handling of the molds and has therefore devised a novel conveyer and dumping mechanism which will remove the mold transportation responsibilities from the hands of the individual foundrymen.

It is a prime object of this invention, therefore, to provide an improved dumping mechanism for a mold conveyer, said mechanism being arranged to automatically dump molds from the conveyer at certain intervals thereby increasing the production capacity and efficiency of a foundry or other manufacturing establishment.

Another object is to provide a conveyer for conveying molds, said conveyer including upper and lower inclined track members arranged to transport a loaded mold carrier to a dumping mechanism, said dumping mechanism being automatically operable to dump molds from the carriers and return the unloaded carriers to a return track.

A further object is to provide a dumping mechanism for automatically dumping molds from a conveyer, said mechanism including a dump cradle arranged to receive a loaded mold carrier, said cradle being tiltable to dump the molds from the carrier and thereupon operable to discharge the unloaded carrier to a return track.

Still another object is to provide a mold conveyer comprising a pair of superimposed track sections, one track section being inclined in a direction opposite with respect to the other, and automatic dump means for dumping mold carriers carried on said sections, said means also being arranged to direct the carriers from one track section to the other.

A still further object is to provide an improved dumping mechanism for a mold conveyer, said mechanism including a cradle, said cradle being tiltable by the weight of a loaded mold carrier to dump the molds therefrom and operable to return the empty carrier to a return track.

Another object is to provide a dump cradle for dumping mold carriers, said cradle being tiltable by the weight of the loaded carriers and having balancing means in the form of counterweights.

These and further objects will become more readily apparent upon a reading of the specification when examined in connection with the accompanying drawings.

In the drawings:

Figure 1 is a side elevational view of a section of a mold conveyer;

Figure 2 is a side elevational view of a discharge end of a mold conveyer showing a dumping mechanism therefor;

Figure 5 is a side elevational view of a dumping mechanism showing said mechanism in an initial dumping position;

Figure 6 is a view similar to Figure 5 showing the dumping mechanism in a full dumping position;

Figure 7 is a view in side elevation showing the dumping mechanism in a position for discharging a mold carrier;

Figure 8 is a side elevational view of a dumping mechanism showing said mechanism in the process of dumping a mold of large proportions;

Figure 9 is a sectional view taken along the line 9—9 of Figure 3 showing a latching device for the dumping mechanism.

Figure 3:
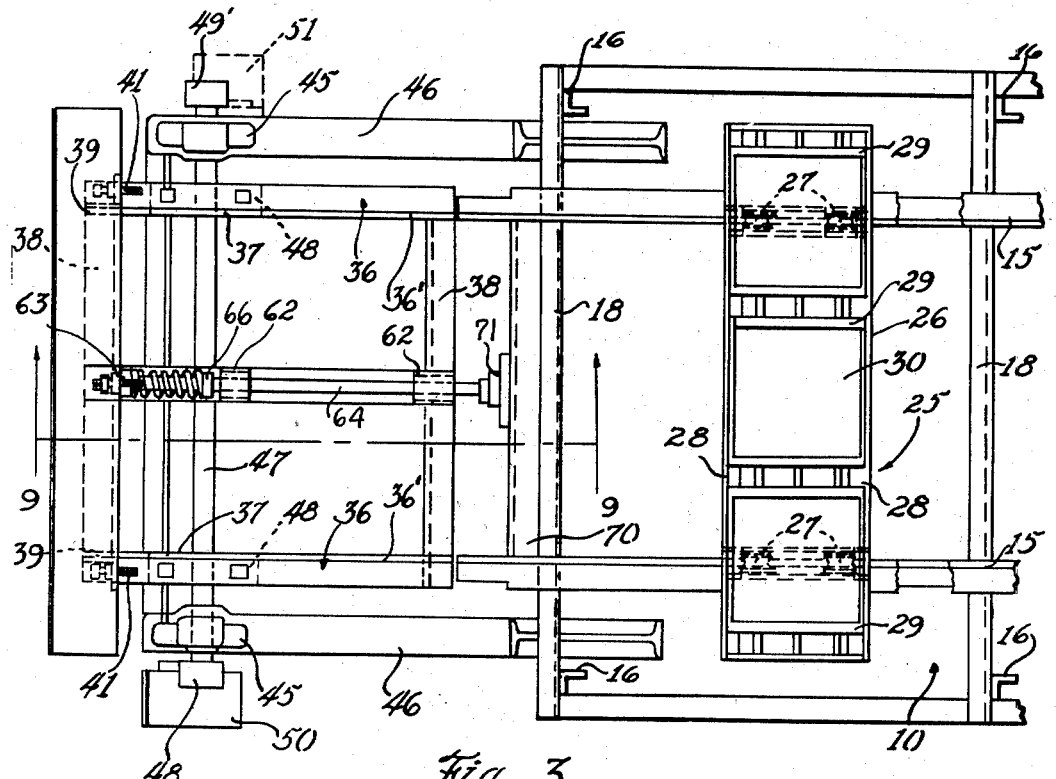
Figure 3 is a plan view of a dumping mechanism for a mold conveyer.
Figure 4:
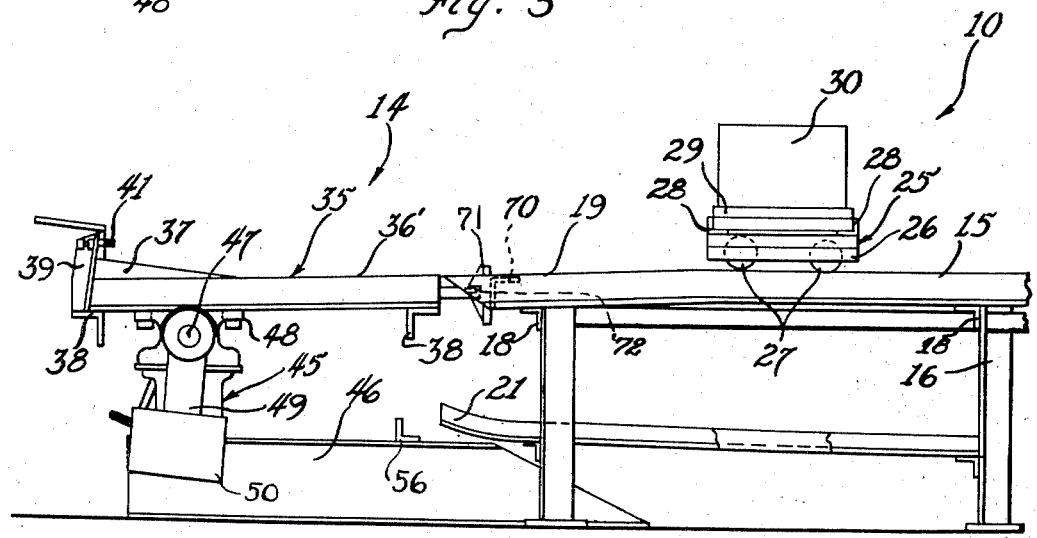
Figure 4 is a side elevational view of the dumping mechanism.

Referring particularly to Figure 1, a mold conveyer is generally designated by the reference character 10. The conveyer 10 includes a loading end or section 11, a pouring section 12, and a cooling and discharge section 13. A dumping mechanism is generally designated by the reference character 14.

The conveyer 10 comprises a pair of laterally spaced upper tracks 15, which may be formed of angle members, and which extend substantially horizontally. The upper tracks 15 are securely connected to vertical ground supports 16 which are horizontally spaced the length of the conveyer 10. As best shown in Figure 3, the supports 16 are transversely spaced for supporting the upper tracks 15. The vertical ground supports 16 are in turn connected by diagonal supports or braces 17. Laterally extending angle bars 18 further assist in stabilizing the upper tracks 15. As best shown in Figures 5, 6, and 7 the upper track 15 is provided with an inclined portion 19, sloping generally downwardly.

The conveyer 10 also includes lower tracks 20 which also may be formed of angle members. The tracks 20 are laterally spaced in vertical alignment with the upper tracks 15. They are also securely supported by the vertical supports 16. As best shown in Figures 1 and 2, the lower tracks 20 slope, or are inclined downwardly toward the loading section 11. The inclination is opposite the inclination of the inclined portion 19 of the upper track 15. The tracks 20 are provided at one end with upturned portions 21.

The conveyer 10 is constructed to movably support a plurality of mold carriers generally referred to by the reference character 25. The carriers 25 consist generally of a laterally extending base 26 which is supported on track wheels 27. The base 26 may be of welded steel construction and also includes a pair of laterally extending spaced angle bars 28 which in turn serve to securely position a plurality of conventional type mold boards 29. The mold boards 29 support molds 30 on the carriers 25. The carriers 25 may be moved to any position on the tracks 15 and 20.

The dumping mechanism 14 includes a dumping cradle 35. The cradle 35 includes a pair of spaced track members 36 which are transversely spaced to be placed in registering alignment with either the upper or lower tracks 15 and 20 respectively. The track members 36 have first track portions 36' thereof sloping in the same inclined plane as the inclined portion 19 of the upper tracks 15. The ends of the spaced track members 36 are provided with second track portions 37 which are inclined in a direction opposite to the inclined portions 36'. The second portions 37 may be constructed of triangular plate members which may be secured to the tracks 36 by welding or other securing process.

The tracks 36 are connected by laterally extending angle bars 38. Vertical angle brackets 39 are connected to the ends of the tracks 36. The angle brackets 39 support a laterally extending plate 40, the purpose of which will become more apparent later. Adjustable stops 41, in the form of set screws, also are supported by the angle brackets 39.

The cradle 35 is tiltably or pivotally supported on a pair of stationary supports 45. The stationary supports 45 are laterally spaced and are rigidly connected to the base members 46. The supports 45 pivotally support a transversely extending shaft 47. The shaft 47 is in turn rigidly secured to the cradle 35 by means of brackets 48, which in turn are secured to the tracks 36. The ends of the shaft 47 are in turn connected to lever arms 49 and 49' to which counterweights 50 and 51 may be secured.

Stopping means for limiting the tilting movement of the cradle 35 are best shown in Figures 5, 6, and 7. An adjustable stop 55 is adapted to engage the angle bar 38 and limit tilting movement in one direction. A permanent stop in the form of an angle bar 56 is shown connected to the base members 46.

As best shown in Figures 3 and 9, a latching device for the cradle 35 is generally designated by the reference character 60. A longitudinally extending support 61 is rigidly secured to the angle bars 38 substantially centrally between the tracks 36. The support 61 has connected thereto, a pair of spaced bearing blocks 62 which may be secured by welding or other means. A stop 63 is connected to the rear of the support 61. A latch rod 64 extends through the bearing blocks 62 and stop 63. The latch rod 64 includes at one end, a latch tip 65 and has near its other end a fixed collar 66. A vertical arm 67 is connected to the latch rod 64, said arm including an adjustable stop 68. A spring 69 encircles the rod 64 between the collar 66 and stop 63 and normally urges the rod 64 in a direction toward the upper tracks 15.

The inclined portion 19 of the tracks 15 is connected by means of a transverse support 70. The support 70 carries centrally thereon an engaging member 71 having a notch 72 for engaging the latch tip 65 in locking engagement. The engaging member 71 has an upper jaw 73 projecting farther outwardly through a lower jaw 74, the purpose of which will become more apparent later.

The operation

In the operation of the mold conveyor 10, the molds 30 are loaded on the carriers 25 which support the mold boards 29. As best shown in Figure 1, an operator may then normally push the loaded carriers from the loading end 11, to the pouring section 12. At this point the molds are filled with metal which may be poured from ladles carried by overhead cranes (not shown).

The filled molds are then moved along the conveyer to the cooling section 13 whereupon after cooling they are ready for discharge. As the carriers 25 are moved successively along the conveyor, the carrier nearest the discharge section rides downwardly under gravity on the inclined portion 19 of the track 15, unto the cradle 35.

Since the track portion 36' is also inclined the carrier gathers forward momentum and rides upwardly on the track portions 37. As best shown in Figure 5, the carrier 25 thereupon engages the stop 68 thereby moving the latch rod 64 agains tthe action of the spring 69, thereupon disengaging the tip 65 from the engaging member 71. The carrier thereupon engages the adjustable stops 41 whereupon its movement with respect to the cradle ceases. It should be noted that the cradle is tiltable about the horizontal axis of the shaft 47, and that the track portions 36' and 37 are positioned at opposite sides of this horizontal axis in teetering relation. The weight of the molds 30 and the carrier 25 is now considerably to the rear of the horizontal axis of the cradle and the cradle thereupon tilts in a counterclockwise direction to the position shown in Figure 6. The tilting action is against the pendulum action of the counterweight 50, and the molds 30 are dumped from the carrier and mold boards into a conveyor or depository as may be desired.

Immediately after the molds 30 have been thus dumped, the counterweight 50 operates to tilt the cradle in a clockwise direction, to a substantially normal or level position with respect to the upper tracks 15, whereupon the tracks 36 are in registering alignment with the tracks 15. While this tilting action is taking place, and before the latch 60 can lock, the carrier 25 rides down the inclined slope or section 37, over the horizontal axis of the shaft 47. The weight of the mold boards and empty carrier thereupon is effective to tilt the cradle clockwise against the leveling, or pendulum action of the counterweight until the tracks 36 are in registering alignment with the lower tracks 20. At this point the carrier is discharged from the cradle and returns down the inclined track to the loading end 11. The pendulum effect of the counterweight 50 is now effective to again swing the cradle into alignment with the upper track 15 whereupon the latch rod 64 is engaged with the member 71, and the cradle is locked into position until a subsequent dumping action takes place.

Since the jaws 73 of the engaging member 71 project outwardly with respect to the jaws 74, the latch rod 64 will not be locked during the clockwise tilting of the cradle, but will pass over the jaws 74 without engagement. The latch rod will be latched when the cradle returns to its initial position after discharging the carrier.

The modification shown in Figure 8 includes a mold 80 of much larger dimensions than the molds 30. Mold boards 81 are specially provided to retain the mold 80 on the carrier 25. For the purpose of providing sufficient counterbalancing means the additional counterweight 51 may be utilized. The plate 40 serves as a support for the mold boards 81 during dumping.

It can now be seen that an efficient mechanism has been provided for increasing the production efficiency of foundry operations. The molds can be poured and dumped without the necessity of complex handling procedures. The dumping mechanism is positive and completely automatic. Its simplicity assures positive operation at all times without the necessity of extensive maintenance and upkeep. The dumping mechanism can be readily adjusted for different weight molds by a change in the weight or position of the counterweights. An automatic return for the carriers is also provided and accomplished during the same dumping sequence.

It now is clear that the objects of the invention have been fully achieved. It must be realized that changes or other modifications may be made which do not depart from the spirit of the invention as disclosed nor the scope thereof as defined in the appended claims.

What is claimed:

1. A mold conveyor comprising in combination; an upper track section; a lower inclined track section; a mold dumping means arranged adjacent to one end of the track sections, said dumping means including a tilting dumping cradle having a first inclined track section and a second track section inclined in a direction opposite to said first track section; a movable latch on the cradle, said latch being engageable with said upper track section to lock the first track section in normally cooperative relation with said upper track section and thereby provide a continuation thereof; a counterweight connected to said cradle and bodily tiltable therewith; and a mold carrier movable by gravity on said track sections, said carrier being adapted to move over the second track section and engage said movable latch, whereby said latch is unlocked and the weight of the mold carrier tilts said cradle and said second section downwardly thereby dumping the molds from said carrier, said counterweight being bodily tiltable with the cradle to return said cradle to its normal position, whereby the empty carrier moves from the second track section to the first track section and whereby the weight of said carrier tilts said first section downwardly into alignment with the lower track section, said carrier thereupon being delivered to said lower track section, and said counterweight being arranged to bodily tilt said cradle to return said cradle to its normal locked position with respect to said upper track section.

2. A mold conveyor comprising in combination; an upper track section having an inclined portion; a lower track section inclined in a direction opposite to the inclined portion; a mold dumping means, said means including a support; a dumping cradle connected to said support for pivotal movement about a horizontal axis, said cradle including a first track section inclined generally in the same direction as the inclined portion of the upper track section, and a second track section inclined in a direction opposite to said first track section, said first and second track sections being generally disposed at opposed sides of the horizontal axis of said cradle; a permanent stop at one end of said second track section; a movable latch on the cradle, said latch being engageable with said upper track section to lock the first track section in normally cooperative relation with said upper track section and thereby provide a continuation thereof; a counterweight rotatable with said cradle; and a mold carrier movable by gravity on said track sections, said carrier being adapted to move over the second track section and engage said movable latch, whereby said latch is unlocked and the weight of the mold carrier tilts said cradle and said second section downwardly thereby dumping the molds from said carrier, said counterweight being adapted to return said cradle to its normal position, whereby the empty carrier moves from the second track section to the first track section and whereby the weight of said carrier tilts said first section downwardly into alignment with the lower track section, said carrier thereupon being delivered to said lower track section, and said counterweight being arranged to return said cradle to its normal locked position with respect to said upper track section.

3. In a mold dumping cradle, a track having a substantially horizontal track section at its rearward end and a track section sloping upwardly from the horizontal track at its forward end, means pivotally supporting the track intermediate its ends for pivotal movement about a horizontal axis, said horizontal track section being arranged to receive a mold carrier from a conveyer, the carrier being adapted to travel from the horizontal track section upwardly on the upwardly extending track section to the forward end of the track whereby the weight of the carrier tilts the cradle thereby dumping the mold from the carrier, a counterweight connected to the cradle for tilting the track to its normal horizontal position whereby the carrier travels downwardly on the upwardly sloping track section to the horizontal track section to the rear of the track, whereby the weight of the empty carrier tilts the cradle thereby discharging the carrier, the counterweight being constructed and arranged to tilt the track to its normal horizontal position.

4. A conveyer for transporting molds having an upper track section and a lower track section sloping with respect to the upper track section, and mold carriers movable on the track sections; the combination therewith of a mold dumping cradle positioned at one end of the track sections, said cradle including a track section having a generally horizontally extending rearward track adapted to register alternately with either the upper or the lower track sections, and an upwardly extending forward track, means pivotally supporting said cradle for tilting movement about a horizontal axis, said rearward track being arranged to receive a mold carrier from the upper track section, the carrier being movable upwardly on the forward track section whereby the track section is tilted downwardly discharging the mold from the carrier, a counterweight connected to the track section and movable therewith for tilting the track section and the rearward track into registering alignment with respect to the upper track section whereby the empty carrier travels by gravity down the forward track to the rearward track, the weight of said empty carrier thereby tilting the track section downwardly whereby the rearward track is placed into registering alignment with said lower track section thereby discharging the carrier thereto, said counterweight being constructed and arranged to tilt the track section and return the rearward track into its aligned position with the upper track.

5. A conveyor for transporting molds having an upper track section and a lower track section sloping with respect to the upper track section and mold carriers movable on the track section; the combination therewith of a mold dumping cradle positioned at one end of the track sections said cradle including a short track section, means pivotally mounting the short track section intermediate its ends for pivotal movement about a horizontal axis, an arm connected to said short track section, a counterweight connected to said arm, said arm extending downwardly substantially in a vertical direction during the normal position of said cradle wherein the short track section is in substantial horizontal registering alignment with the upper track section, a stop on said cradle, said stop being arranged to be engaged by a loaded mold carrier traveling onto said short track section whereupon one end of said short track section is tilted downwardly and said counterweight is moved in a counter-clockwise direction whereby the mold is dumped from the carrier, said counterweight thereupon moving in a clockwise direction for urging the short track section to a substantially horizontal position whereupon the weight of said empty carrier tilts a second end of said short track section downwardly moving said counterweight in a clockwise direction until the empty carrier is discharged to the lower track section, whereupon said counterweight moves in a counter-clockwise direction threupon urging said short track section to a substantially horizontal position and latch means between said short track section and the upper track section for maintaining the track sections in registering alignment.

6. In a dumping cradle for mold conveyors adapted to receive mold carriers from a conveyor having upper and lower track section; a short track section, means supporting said short track section for pivotal movement about a horizontal axis, said means including a transverse shaft connected to the short track section, supports for supporting said shaft, an arm connected to said shaft and movable therewith, a counterweight connected to said arm, said arm extending downwardly substantially vertically during the normal horizontal position of said short track section wherein said track section is in registering alignment with an upper track section, a stop on said cradle, said stop being arranged to be engaged by a loaded mold carrier for tilting one end of the short track section downwardly whereby a mold is discharged from the carrier and said counterweight is moved in a counter-clockwise direction, said counterweight thereupon moving in a clockwise direction for urging said short track section again to a substantially horizontal position whereupon the weight of the empty carrier tilts a second end of said short track section downwardly moving said counterweight in a clockwise direction until the empty carrier is discharged to the lower track section, whereupon said counterweight moves in a counter-clockwise direction thereupon urging said short track section to a substantially horizontal position and latch means between the short track section and the upper track section for maintaining the track sections in registering alignment.

7. In a dumping cradle for mold conveyers adapted to receive mold carriers from a conveyer having upper and lower track sections; a short track section, a shaft connected to the short track section and extending transversely with respect thereto, a support pivotally mounting said shaft for movement about a horizontal axis, an arm connected to and movable with said shaft, a counterweight connected to said arm, said arm normally extending downwardly during a position wherein said short track section is in registering alignment with the upper track section, an upwardly inclined surface on said short track section, a stop on said short track section, said stop being arranged to be engaged by a loaded mold carrier for tilting one end of the short track section downwardly whereby a mold is discharged from the carrier and said counterweight is moved in a counter-clockwise direction, said counterweight thereupon moving in a clockwise direction for urging said short track section to a substantially horizontal position whereupon the empty carrier moves downwardly on the inclined surface from one end of the short track section to a second end thereby tilting the second end downwardly whereupon said carrier is discharged to a lower track section and said counterweight is moved in a clockwise direction, said counterweight and said arm being constructed and arranged to return said short track section to its substantially horizontal position in registering alignment with the upper track section.

8. In a dumping arrangement for a conveyer having an inclined upper track section and a lower track section inclined in an opposite direction; a tilting track section movable alternately into cooperative alignment with the upper and lower sections thereby alternately providing a continuation of either; a loaded article carrier movable from said upper track section to one end of said tilting track section, one end of said tilting track section thereby being tilted downwardly by the weight of the loaded carrier whereby the articles are dumped, a counterweight connected to said tilting track section for tilting said section into horizontal alignment with said upper track section, means on said tilting track section for moving said carrier to a second end of said tilting track section during the horizontal position of said section whereby the weight of the carrier tilts the second end of said tilting track section downwardly against the action of the counterweight into cooperative alignment with said lower track section thereby delivering the carrier thereto; said counterweight being constructed and arranged to return the empty tilting track section into cooperative alignment with the upper track section.

RUSSELL J. ANDERSON.

REFERENCES CITED

The following references are of record in the file of this patent:

UNITED STATES PATENTS

| Number | Name | Date |
|---|---|---|
| Re. 13,399 | Logan | Apr. 9, 1912 |
| 753,719 | Logan | Mar. 1, 1904 |
| 988,462 | Greene et al. | Apr. 4, 1911 |
| 1,565,949 | Morrow | Dec. 15, 1925 |